US00RE40689E

(19) United States
(12) Reissued Patent
Quan et al.

(10) Patent Number: US RE40,689 E
(45) Date of Reissued Patent: Mar. 31, 2009

(54) METHOD AND APPARATUS FOR DISABLING ANTI-COPY PROTECTION SYSTEM IN VIDEO SIGNALS

(75) Inventors: Ronald Quan, Cupertino, CA (US); John F. Peruzzi, Redwood City, CA (US)

(73) Assignee: Macrovision Corporation, Santa Clara, CA (US)

(21) Appl. No.: 08/405,482

(22) Filed: Mar. 16, 1995

Related U.S. Patent Documents

Reissue of:

(64) Patent No.: 5,194,965
Issued: Mar. 16, 1993
Appl. No.: 08/614,185
Filed: Nov. 13, 1990

U.S. Applications:

(63) Continuation-in-part of application No. 06/935,055, filed on Nov. 21, 1986, now Pat. No. 5,130,810, which is a continuation of application No. 06/554,697, filed on Nov. 23, 1983, now abandoned.

(51) Int. Cl.

| | |
|---|---|
| ***H04N 5/76*** | (2006.01) |
| ***H04N 5/93*** | (2006.01) |
| ***H04N 7/00*** | (2006.01) |
| ***H04N 7/167*** | (2006.01) |
| ***H04N 9/00*** | (2006.01) |
| ***H04N 9/79*** | (2006.01) |
| ***G11B 15/04*** | (2006.01) |
| ***G11B 19/04*** | (2006.01) |

(52) U.S. Cl. ..... 386/94; 386/1; 386/45; 386/46; 386/83; 386/E5.004; 386/93; 360/60; 380/201; 380/203; 380/204

(58) Field of Classification Search ..... 386/1, 386/45, 46, 83, 93, 94, E5.004; 360/60, 33.1; 380/201, 203, 204, 5, 12, 15, 38; 358/335; *H04N 5/76*

See application file for complete search history.

(56) References Cited

U.S. PATENT DOCUMENTS

| | | | | | |
|---|---|---|---|---|---|
| 4,695,901 | A | * | 9/1987 | Ryan | 358/335 |
| 4,819,098 | A | | 4/1989 | Ryan | |
| 4,870,297 | A | | 9/1989 | Karlock | 307/236 |
| 4,907,093 | A | * | 3/1990 | Ryan | 358/335 |
| 4,912,691 | A | * | 3/1990 | Jones | 380/5 |
| 4,937,679 | A | | 6/1990 | Ryan | |
| 4,951,315 | A | * | 8/1990 | Switsen | 380/15 |
| 5,003,592 | A | * | 3/1991 | Pirez | 380/12 |
| 5,034,981 | A | | 7/1991 | Leonard et al. | 380/15 |
| 5,058,157 | A | * | 10/1991 | Ryan | 380/15 |
| 5,113,440 | A | * | 5/1992 | Harney et al. | 380/15 |
| 5,130,810 | A | | 7/1992 | Ryan | |
| 5,157,510 | A | | 10/1992 | Quan | |
| 5,179,452 | A | * | 1/1993 | Takahashi | 358/335 |

* cited by examiner

*Primary Examiner*—Thai Tran
*Assistant Examiner*—Gelek Topgyal
(74) *Attorney, Agent, or Firm*—Morrison & Foerster LLP

(57) ABSTRACT

A method and apparatus for disabling the effect of copy-protect signals placed in a recording video signals which is based on differences in the characteristics of television and VCR circuitry. Copy-protect signals include pseudo-sync pulses and/or added AGC pulses in the blanking interval of a video signal. The specific method described includes altering the level of the video signal during the vertical blanking interval, e.g., level-shifting, so as to render the [copy-protect] *copy protection* signals ineffective [to prevent] *in preventing* unauthorized copying by a VCR. A circuit for achieving the method includes a sync separator for detecting the vertical blanking interval, pulse generating circuits for producing pulses of predetermined widths during this interval, and a summing circuit for summing the predetermined pulses with copy-protect signals thereby to shift their level. An alternative method includes increasing the effective frequency of the copy-protect signals during the vertical blanking interval so as to achieve attenuation and/or low-pass filtering in the VCR circuitry to there by [render] *rendering* the *modified* signals ineffective in preventing copying. A circuit for achieving this method includes pulse narrowing and/or pulse multiplication circuitry which effectively increased the high-frequency content of the pseudo-sync and/or AGC pulses.

41 Claims, 10 Drawing Sheets

METHOD AND APPARATUS FOR DISABLING ANTI-COPY PROTECTION SYSTEM IN VIDEO SIGNALS

Matter enclosed in heavy brackets [ ] appears in the original patent but forms no part of this reissue specification; matter printed in italics indicates the additions made by reissue.

CROSS REFERENCE TO RELATED APPLICATIONS AND PATENTS

This application is a continuation-in-part of copending patent applications Ser. No. 06/935,055 filed Nov. 21, [1989] *1986*, for "METHOD AND APPARATUS FOR PROCESSING A VIDEO SIGNAL SO AS TO PROHIBIT THE MAKING OF ACCEPTABLE VIDEO TAPE RECORDINGS", now U.S. Pat. No. 5,130,810, which is, in turn, a continuation of patent application Ser. No. 06/554,697 filed Nov. 23, 1983, now abandoned.

This invention also is related to commonly owned U.S. Pat. No. 4,631,603 entitled "METHOD AND APPARATUS FOR PROCESSING VIDEO SIGNALS SO AS TO PROHIBIT THE MAKING OF ACCEPTABLE VIDEO TAPE RECORDINGS THEREOF" which issued on Dec. 12, 1986; to U.S. Pat. No. 4,695,901 entitled "METHOD AND APPARATUS FOR REMOVING PSEUDO-SYNC AND/OR AGC PULSES FROM A VIDEO SIGNAL" which issued on Sep. 22, 1987; to U.S. Pat. No. 4,907,093 for "METHOD AND APPARATUS FOR PREVENTING THE COPYING OF A VIDEO PROGRAM"; to U.S. Pat. No. 4,819,098 for "METHOD AND APPARATUS FOR CLUSTERING MODIFICATIONS MADE TO A VIDEO SIGNAL TO INHIBIT THE MAKING OF ACCEPTABLE VIDEO TAPE RECORDINGS"; and to copending application Ser. No. 07/631,858, filed Dec. 20, 1990, for "METHOD AND APPARATUS FOR DISABLING ANTI-COPY PROTECTION SYSTEM IN VIDEO SIGNALS USING PULSE NARROWING."

DISCLOSURE

BACKGROUND OF THE INVENTION

This invention pertains to a video signal encoding/decoding system, but more specifically, to a method and apparatus for restoring to proper video format a video signal which has previously been encoded with anti-copy protection signals. The invention is useful in restoring video signals which are prerecorded on a video recording medium, such as signals recorded on videotape in a video cassette.

Above-referenced U.S. Pat. No. 4,631,603 and copending patent application Ser. No. 935,055 disclose copy protection systems for use with video signals. The system disclosed in the '603 patent is finding significant usage with video signals on recorded video cassette tapes. The addition of the copy protection signal(s) to a prerecorded video cassette tape prevents unauthorized copying of the tape and still permits viewing of the program from the original tape. The copy protection systems include unique pseudo-synchronizing pulses and/or positive control signals placed at certain locations in the video signal having the effect of inhibiting proper AGC (automatic gain control) adjustment in a video tape recorder (VCR) during recording. As a result, picture quality of unauthorized copies is significantly deteriorated. However, these anti-copy signals do not affect normal viewing of the original tape.

To explain the copy-protect processes, a typical video signal defines normal viewing fields (e.g., those parts displayed on a television set) and vertical blanking intervals between the fields. Both the viewing fields and the vertical blanking intervals include series of horizontal scan lines carrying picture data and control information that includes for each line, a horizontal synchronizing pulse. The horizontal sync signals are used for horizontally registering successive scan lines. Other synchronizing pulses, e.g. broad pulses and equalizing pulses, normally occur during the vertical blanking interval. These pulses generally are called vertical synchronizing (or sync) pulses because they occur only during the vertical blanking interval. A television monitor or set, and also the processing circuitry associated with VCR recording, uses the vertical sync pulses for vertical roll synchronization and to trigger AGC gain adjustment. Alteration, modification or distortion of these signals can have a deleterious affect on picture quality.

Certain portions of a normal viewing field defined by a video signal typically are not used for defining the actual picture. More specifically, the horizontal scan lines immediately adjacent to those portions of a video signal defining vertical blanking intervals are not used in typical television monitors or sets to define the picture. Therefore those signal portions immediately adjacent to vertical blanking intervals are also available in their entirety for the addition of anti-copy protection signals. Thus, insofar as this invention is concerned, such signal portions are also be considered part of the vertical blanking intervals, and the term "vertical blanking interval" as used herein encompasses the same unless it is clear from the usage that only the actual vertical blanking interval is meant.

The aforementioned copy-protection systems change a normal video signal by adding positive (AGC) and/or pseudo-sync pulses after at least some of the normal sync pulses. By "added" pulses are meant pulses which are incorporated into the video signal to prevent copying, i.e., signals which supplement the normal video signal carrying typical picture data and control information. That is, the term "added" as used herein refers to the type of signal, rather than to the time at which it may be incorporated with the remainder of the video signal. In the arrangement disclosed in U.S. Pat. No. 4,631,603, the added pulses appear in the vertical blanking interval so as to interfere with a VCR's vertical synchronizing and/or AGC circuitry.

Under certain circumstances, there is a need to disable the copy protection system to permit recording of copy-protected recordings, such as, for example, during authorized and permitted copying or for studio editing purposes. Assignee's U.S. Pat. No. 4,695,901 discloses several embodiments of one such system. It is an objective of the present invention to provide an improvement for disabling an anti-copy system.

SUMMARY OF THE INVENTION

In accordance with a first embodiment, the invention comprises a method and apparatus for level-shifting at least a portion of those parts of a video signal containing copy-protect signals, such as pseudo-sync or AGC pulses occurring during the vertical blanking intervals of a video signal, by an amount which enables acceptable copying of a video signal containing such parts. Level-shifting is preferably attained by detecting at least the copy protect signals, generating timing pulses based upon the detection to define a period to be level-shifted, and altering the video signal by level-shifting the same in accordance with the defined period. The invention comprehends detecting the copyright-protect signals indirectly. For example, if the copy protection signals are in the vertical blanking interval then the detection can be of the vertical blanking interval rather than of the copy-protect signals themselves.

In accordance with a second embodiment, the invention comprises a method and apparatus for narrowing the width and/or attenuating at least some of the pulses, such as added pseudo-sync and/or AGC pulses, by such an amount that the VCR circuitry (VCR sync separator and VCR sampling circuits for AGC, for example) fails to respond. Narrowing is preferably achieved by truncating a portion of each of the pulses or spacing them closer together to attain a high-frequency effect. This method and apparatus takes advantage of the limited bandwidth capacity of VCR circuits which behave similar to a low-pass filter while the wider bandwidth capacity of conventional television circuits continues to respond.

These and other aspects, features and advantages of the invention will become apparent upon review of the succeeding description taken in connection with the accompanying drawings. The invention is pointed out with particularity by the appended claims.

DESCRIPTION OF ILLUSTRATIVE EMBODIMENTS

Figure 1:
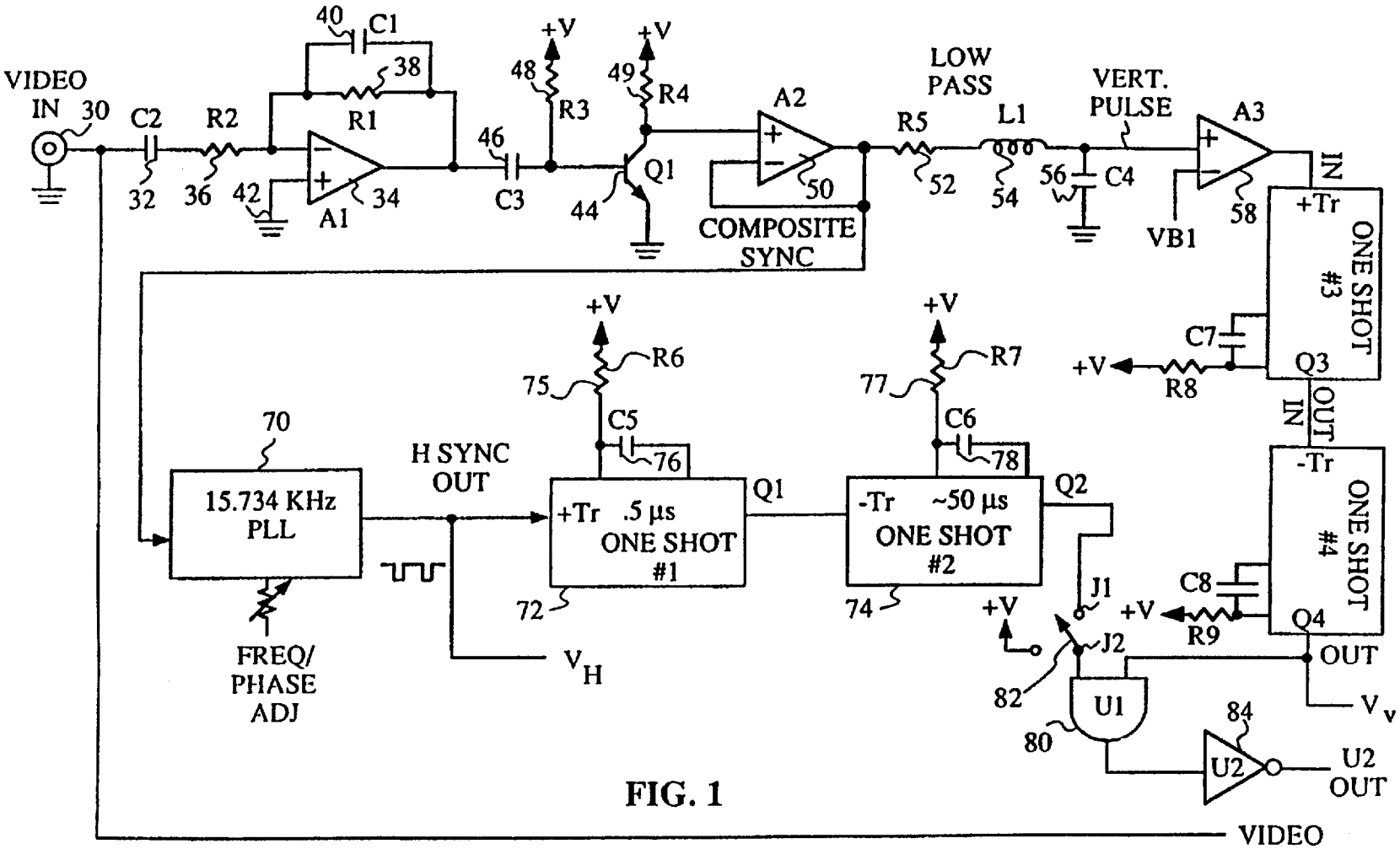
FIGS. 1 and 2 are detailed diagrams of illustrative circuits for achieving level-shifting of copy-protect signals in a video signal so as to render them ineffective in VCR circuitry.
Figure 2:
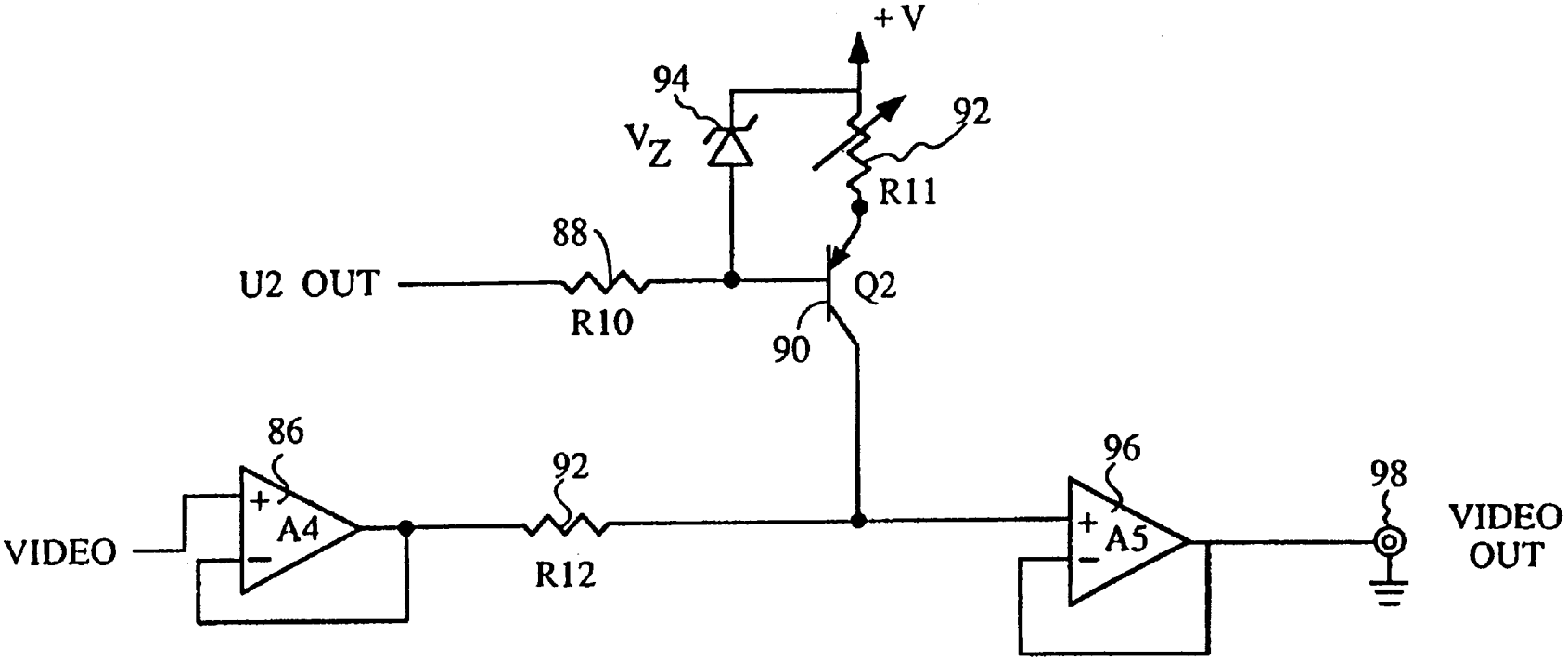

Copy protection of video signals finds its widest use now in the protection of prerecorded tapes. Copy protection therefore will be described in connection with the system of U.S. Pat. No. 4,631,603 for protecting prerecorded tapes of video cassettes. FIGS. 1 to 3 depict a first embodiment of the invention wherein prerecorded encoding signals are displaced or level-shifted to an extent that nullifies VCR copy interference. The illustrated anti-copy signal removal circuit operates on copy-protect signals placed in the vertical blanking interval.

Figures 3A, 3B, 3C, 3D, 3E:
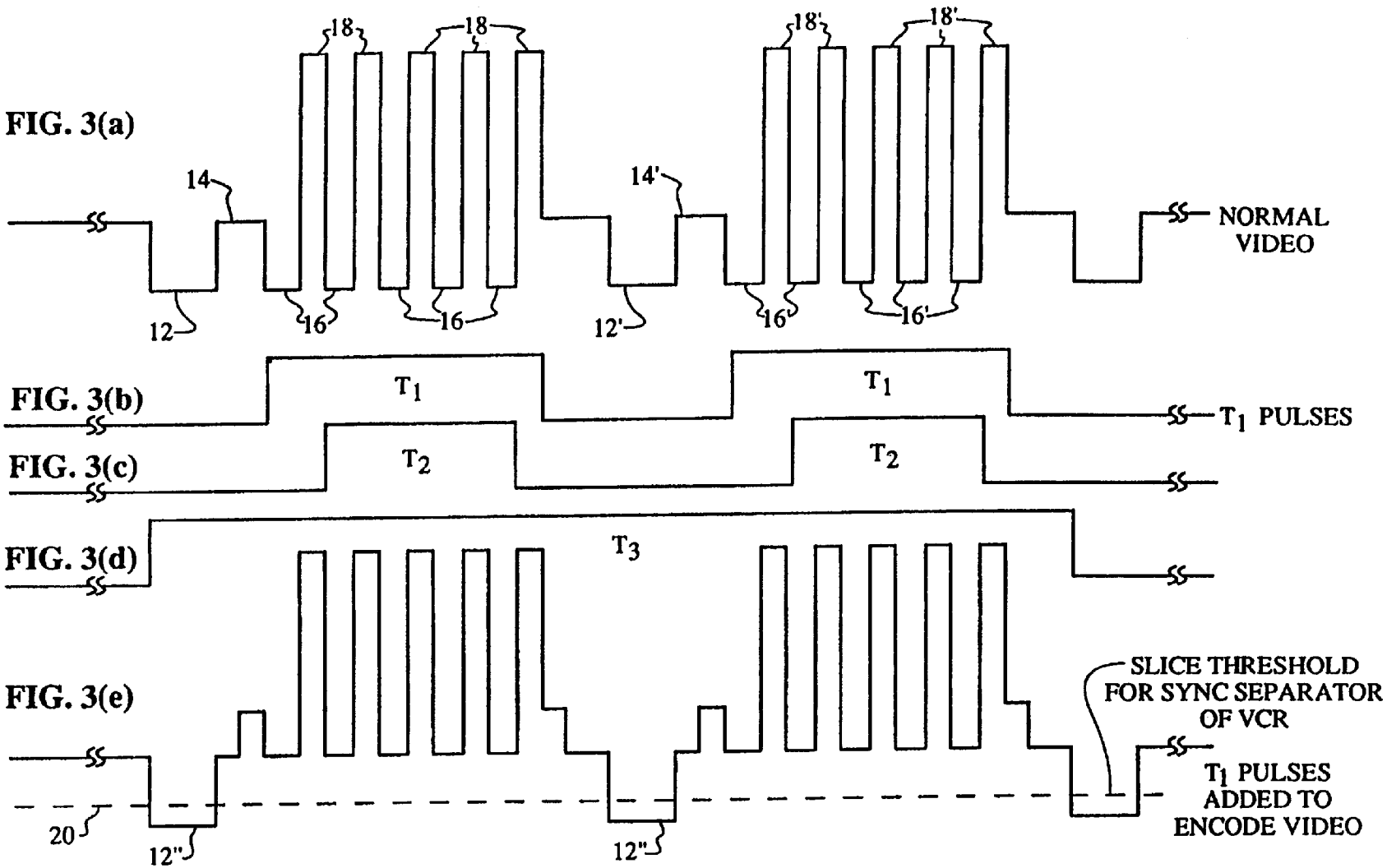
FIGS. 3(a) through 3(e) are waveforms illustrating a method of level-shifting by combining various pulses with normal copy-protect video signals.

As shown in FIG. 3(a), the vertical blanking interval includes a normal negative-going sync pulse 12, a normal positive-going AGC pulse 14, a series of added pseudo-sync pulses 16, and a series of added AGC pulses 18. (It should be noted that pulse 14 can be thought of simply as a return to the normal video blanking or black voltage level.) The direction of positive and negative-going pulses are relative to each other about a reference voltage which typically is the normal blanking or black level of a video signal. The added pseudo-sync AGC pulses contaminate the video by confusing the gain control portion of such VCR signal processing circuitry when pseudo-sync pulses are detected. Level-shifting up the pseudo-sync pulses prevents the pseudo-sync pulses from being detected. A television monitor or receiver, though, works without problem in view of the various normal and added pulses due to its different circuitry to handle AGC.

To enable authorized copying of a prerecorded video signal, disabling means are provided to level-shift all or part of the signals appearing in the vertical blanking interval. Such disabling means preferably comprises summing a pulse T1, T2 or T3, as depicted in FIGS. 3(b), 3(c) or 3(d), with portions of the signal defining vertical blanking intervals as depicted in FIG. 3(a).

FIG. 3(e), for example, depicts modified or altered vertical blanking interval signals resulting from summing T1 pulses of FIG. 3(b) with the vertical blanking interval signals of FIG. 3(a). When the signal is so modified, the processing VCR circuitry responds only to the normal [vertical] *horizontal* sync pulses 12" (FIG. 3(e)) since they are the only negative-going pulses sensed relative to reference level 20 due to their being in an unshifted location in the vertical blanking interval. The remaining pulses above voltage reference 20 are not sensed by the VCR (for AGC purposes for instance).

FIGS. 1 to 2 depict an exemplary circuit for disabling the copy-protect signals of FIG. 3(a) as described above. Video input jack (connector) 30 receives prerecorded video input signals from a medium containing the copy-protect signals and couples them to the negative input of an inverting amplifier 34 via a capacitor 32 and resistor 36. The positive input of the amplifier 34 is connected to a ground reference 42. Resistors 36 and 38 establish the gain level while capacitor 40 absorbs high-frequency noise in the feedback path of the amplifier 34. Amplifier 34 transfers inverted video pulses to the base of an emitter-grounded transistor 44.

Transistor 44 is part of a sync separator circuit which senses the vertical sync pulses upon playback of prerecorded video signals. No AGC pulses are passed by transistor 44. As shown, the emitter of transistor 44 is coupled to ground so that, upon turn-on of transistor 44, its collector voltage drops to ground. Resistor 48 establishes a base input bias for turning on sync-separator transistor 44, and resistor 49 sets bias at the collector output of transistor 44. Inverted video from amplifier 34 is fed to the base of transistor 44 via capacitor 46 to generate a composite sync output at the collector of transistor 44. The composite sync output includes both the normal and pseudo-sync pulses which are supplied to the non-inverting input of a buffer amplifier 50.

Buffer 50 transfers the composite sync output both to a low-pass filter constituted by resistor 52, inductor 54 and capacitor 56; and to a phase-locked loop circuit 70 which is subsequently described. After passage through the low-pass filter, the composite signal becomes a first vertical rate pulse indicative of the vertical blanking intervals of the prerecorded video signal. This first vertical rate pulse is conditioned further by comparator amplifier 58 which has a reference voltage $V_{b1}$ connected to its inverting input and the vertical rate pulse tied to its non-inverting input. Comparator 58 outputs a second vertical rate pulse of a predetermined voltage level $V_{b1}$ to a one-shot circuit 60 which delays the second vertical rate pulse. A second one-shot circuit 62 responds to the trailing edge of a pulse from one-shot circuit 60 to produce yet another pulse $V_V$. Time constants and delays produced by the one-shot circuits 60 and 62 produce a pulse $V_V$ that extends from about lines ten through twenty in the vertical blanking interval.

As mentioned earlier, buffer 50 also supplies the composite video sync pulses to a conventional horizontal rate phase-locked loop (PLL) circuit 70. The circuit 70 produces horizontal sync pulses $V_H$ at a rate of 15.734 kHz in synchronism with horizontal rate pulses of incoming video from the buffer 50. A phase/frequency detector of PLL circuit 70 responds to phase differences between the input and output signals to maintain synchronism. PLL circuit ignores equalizing and pseudo-sync pulses in maintaining phase lock.

In order to produce timed pulses like T1 and T2 within the horizontal period as shown in FIGS. 3(b) and 3(c), one-shot circuit 72 receives a phase-locked output $V_H$ of PLL circuit 70 before supplying the same to another one-shot circuit 74. Subsequently, one-shot circuit 74 produces timed pulses T1 or T2 having a duration dependent upon values of resistor/capacitor time-constant components 75–78 of the respective one-shot circuits.

When switch 82 couples the output of one-shot circuit 74 to AND gate 80, AND gate 80 logically combines the output $V_V$ from one-shot circuit 62 and timed pulse(s) from one-shot circuit 74 thereby to produce T1 or T2 pulses (FIGS. 3(b) to 3(c)) during horizontal scan lines ten through twenty. On the other hand, when switch 82 couples voltage source +V to AND gate 80, AND gate 80 transfers the output $V_V$ from one-shot 62 to inverter 84, in which case, the pulse is similar to T3 (FIG. 3(d)) during lines ten through twenty. Inverter 84 inverts the output of AND gate 80 so that when the output is "high", e.g., asserted, transistor 90 (FIG. 2) turns on to pump current through current-limiting resistor 88 into resistor 92 so as to level-shift the video signal applied to the non-inverting input of amplifier 86. Current flows through resistor 92 to the inverting input and output of amplifier 86 when transistor 90 conducts. Amplifiers 86, 96 are voltage following (unity gain) amplifiers. Variable resistor 92 and Zener diode 94 establish the extent of level-shifting of the video signal in accordance with the amount of current pumped through resistor 92. Pumped current varies according to the relationship $I_P=(V_Z-V_{eb})/R_{92}$, where $I_P$ is the pumped current, $V_Z$ is the avalanche voltage of the Zener diode 94, $V_{eb}$ is the emitter to base voltage of transistor 90, and $R_{92}$ is the value of resistor 92. Preferably, $V_Z$ is 4.7 volts and $V_{eb}$ is 0.7 volts.

Thus, amplifier 86 buffers the input video signal, resistor 92 level-shifts the video as described, and a buffer amplifier 96 buffers the level-shifted video and supplies the same to a video output jack 98 via T1 time constant and J1 connector to J2 in a waveform typically shown by FIG. 3(e). The output signal at jack 98 enables the prerecorded video signal having copy-protect encoding to be recorded by a VCR.

It is noted that the above-described disabling means for removing or reducing the effect of copy-protect signals, such as by level-shifting the video signal, can be accomplished by circuits other than those described.

Figure 4:
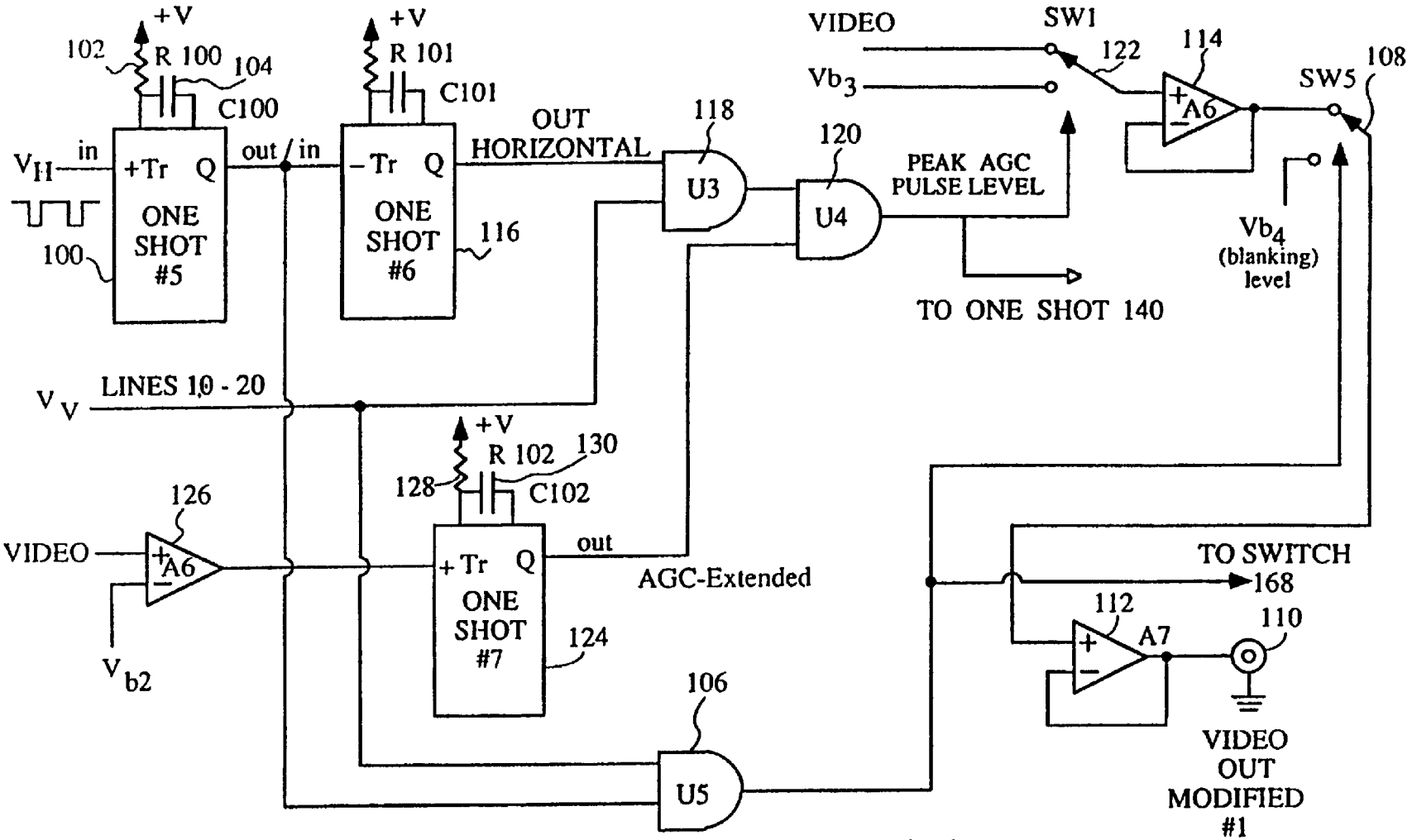
FIG. 4 is a detailed diagram of an illustrative circuit which alters the frequency characteristics of normal copy-protect signals by narrowing widths of pseudo-sync pulses.
Figure 5:
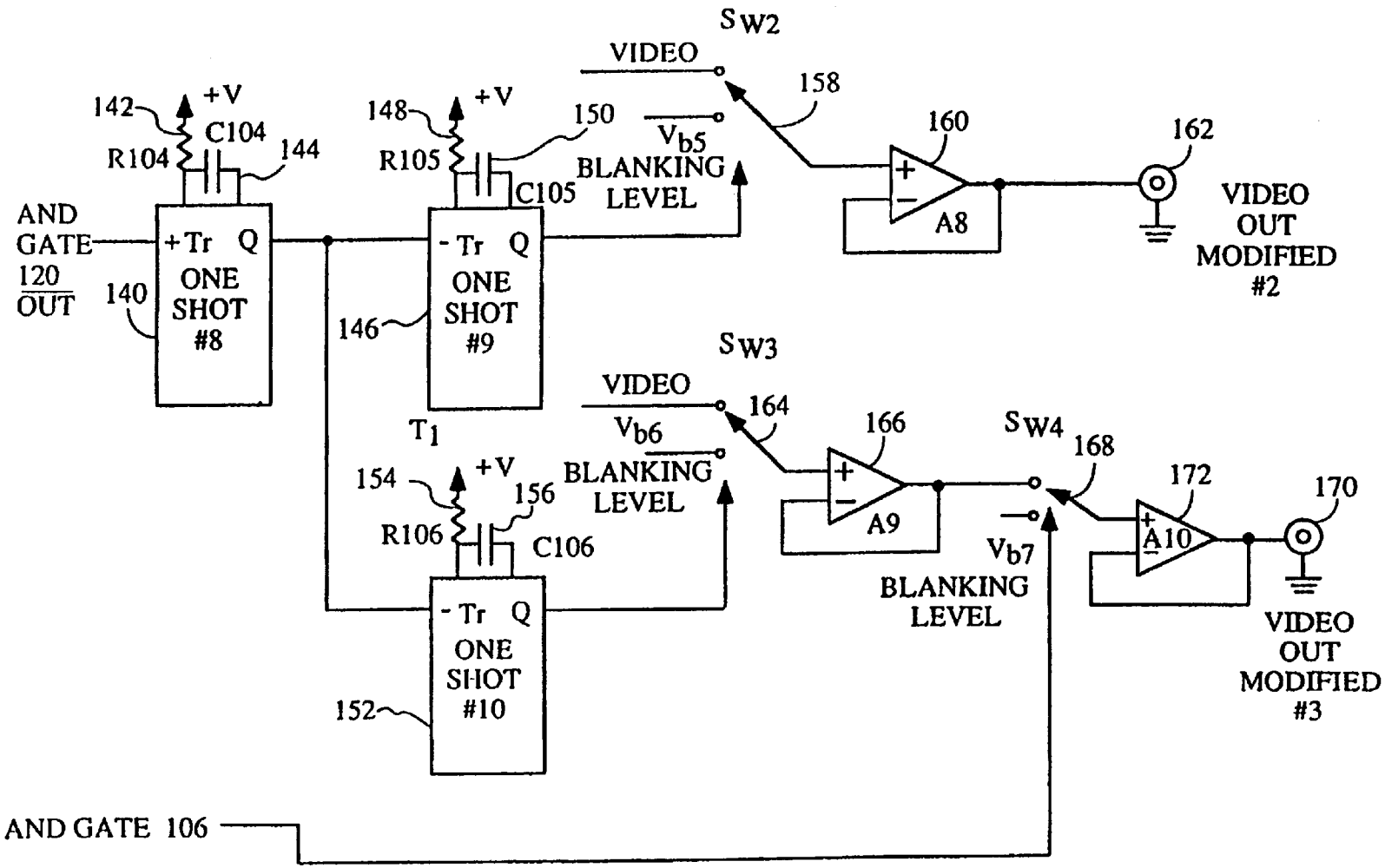
FIG. 5 is a detailed diagram of an illustrative circuit which, in conjunction with the circuit of FIG. 4, narrows either the AGC pulses or both AGC and pseudo-sync pulses.

Circuit diagrams FIGS. 4 and 5 together with the waveforms of FIGS. 6 and 7 illustrate alternative embodiments of the invention which inhibit or disable the effect of the copy-protect signals. In the following described embodiments, disabling or reduction in effect of the copy-protect signals is achieved by interposing a means of attenuation during presence of the copy-protect signals, by narrowing the width of the pseudo-sync and/or AGC pulses, or by otherwise increasing their high-frequency contents by, for example, time-compressing the pulses or adding additional narrow pulses between them to increase their effective frequency. Such means can be employed during all or part of the duration of the copy-protect signals. These embodiments are illustrative of any such means which alters, modifies or changes the video signal in a fashion where, because of the relatively slow response time (lowered video bandwidth) or other characteristic of a VCR, the copy-protect signals become less effective or are nullified to prevent unauthorized copying.

Figure 6A:
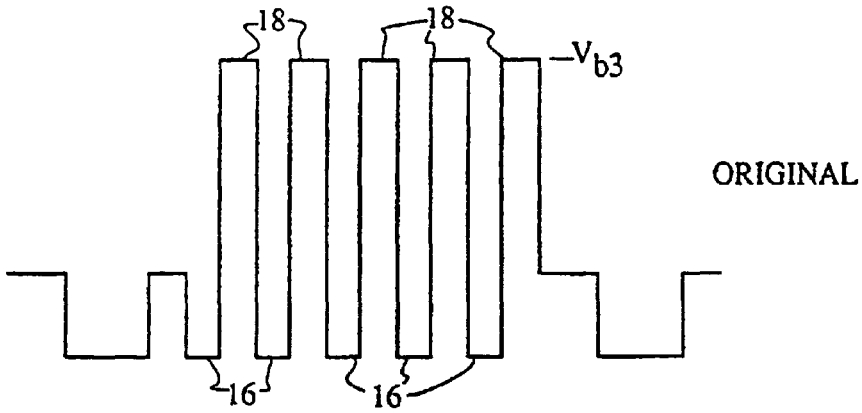
FIGS. 6(a) through 6(j) are waveforms for explaining the operation of the circuits of FIGS. 4 and 5.
Figure 6B:
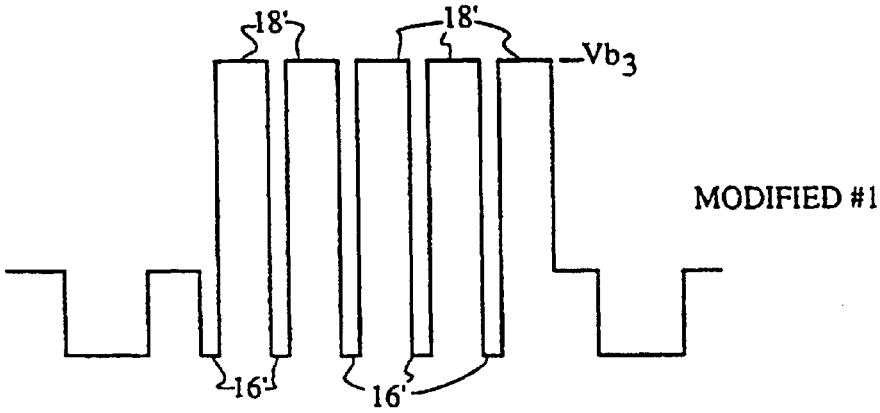

FIG. 6(a) depict typical prerecorded signals in the blanking interval as described with reference with FIG. 3(a). By way of example, FIG. 6(b) illustrates the results of a first modification wherein the pseudo-sync pulses 16' are narrowed to an extent that the VCR cannot respond to them. FIG. 6(i) illustrates the results of a second modification wherein AGC pulses 18' are narrowed. FIG. 6(j) illustrates the results of yet a third modification where both the pseudo-sync pulses 16' and AGC pulses 18' are narrowed. Other variations or modifications, such as attenuation, level-shifting, pulse narrowing, pulse extension, signal substitution or removal, or any combination thereof may also be employed to achieve the intended result of enabling copying of video signals having the copy-protect signals.

With the aid of other waveforms shown in FIG. 6, the pulse narrowing circuits of FIGS. 4 and 5 are described as illustrative of a circuit for disabling the effects of copy-protect signals. FIG. 4 illustrates a circuit for narrowing pseudo-sync pulses, while FIG. 5 illustrates a circuit for narrowing AGC pulses or both AGC and pseudo-sync pulses. The copy-protect disabling means may include either or both of these circuits.

Figure 6C:
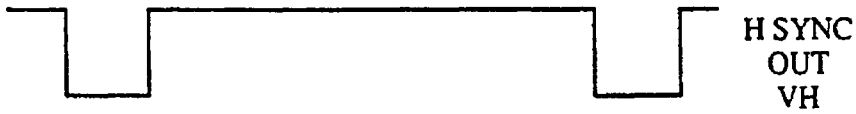
Figure 6D:
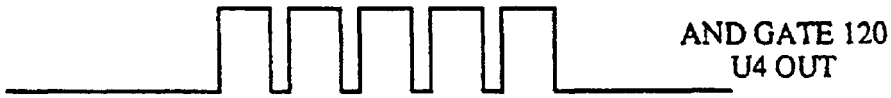
Figure 6E:
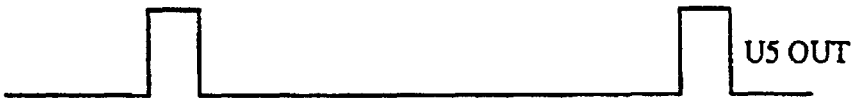

With reference to the pseudo-sync pulse narrowing circuit of FIG. 4, a horizontal sync pulse $V_H$ (FIG. 6(c)) provided from a circuit described in FIG. 1 is supplied to a one-shot circuit 100. One-shot 100 extends the duration of the horizontal sync pulse and provides an output pulse accordingly. Resistor 102 and capacitor 104 establish the duration of the output pulse of one-shot circuit 100. The circuit of FIG. 4 also receives a vertical rate sync pulse $V_V$, also described in connection with FIG. 1. Both the extended horizontal sync pulse from one-shot 100 and the vertical rate sync pulse $V_V$ are supplied to the inputs of AND gate (U5) 106, the outputs of which, shown in FIG. 6(e), controls an analog switch 108. When AND gate 106 is asserted, switch 108 couples video output 110 via buffer 112 to a blanking reference voltage $V_{b4}$ for a time duration so as to narrow the first pseudo-sync pulse as indicated in FIG. 6(b). When AND gate 106 is deasserted, switch 108 couples the video output to the signal emanating from buffer 114. The output of buffer 114 is thereby switch to buffer amplifier 112, which in turn, produces video output at 110 having narrowed AGC pulses.

One-shot circuit 100 also supplies an output to another one-shot circuit 116 thereby to produce at the output one-shot 116 a signal indicative of the horizontal line period, e.g., a horizontal active line gate. AND gate (U3) 118 produces an active horizontal video gate signal for scan lines 10 through 20 by logically combining the output of one-shot circuit 116 and the vertical rate signal $V_V$.

AND gate (U4) 120 produces a signal for controlling a switch 122 that functions in combination with switch 108 to modify or alter the video output signal at output 110. One input of AND gate 120 is the output of AND gate 118 and the other input is coupled to the output of yet another one-shot circuit 124. One-shot 124 emits a series of pulses triggered by incoming AGC pulses. Also, one-shot 124 triggers on the rising edge of the incoming AGC pulses and produces at its output time-extended AGC pulses. These extended pulses are produced by "slicing" the incoming video signal at a certain voltage level to pass only those pulses above a threshold established by a reference voltage $V_{b2}$. The reference voltage $V_{b2}$ couples the inverting input of differential amplifier 126. Time constant components including resistor 128 and capacitor 130 of one-shot circuit 124 enable it to produce the extended AGC pulses having a duration longer than the original AGC pulses. As a result, the output of AND gate 120 contains all sliced video pulses during lines 10 through 20 in the vertical blanking interval.

Figure 7A:
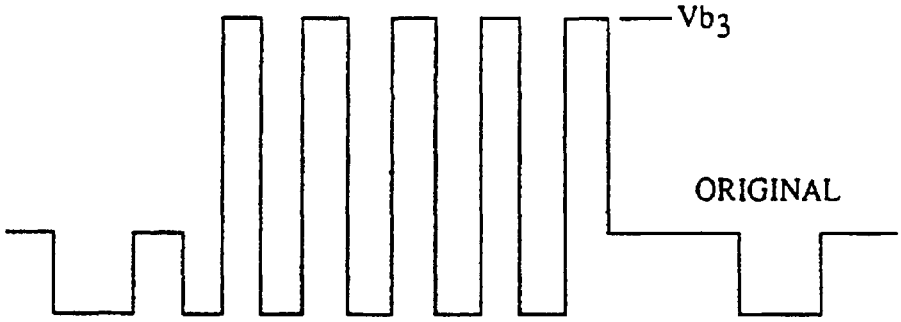
FIGS. 7(a) through 7(i) are waveforms for describing the effect of altered video signals in VCR circuitry.
Figure 7B:
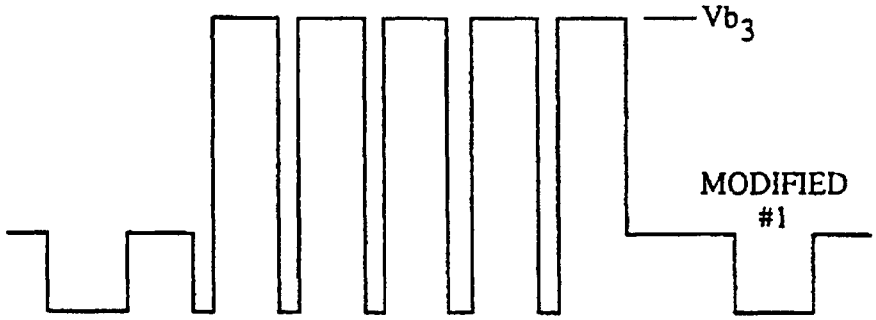
Figure 7C:
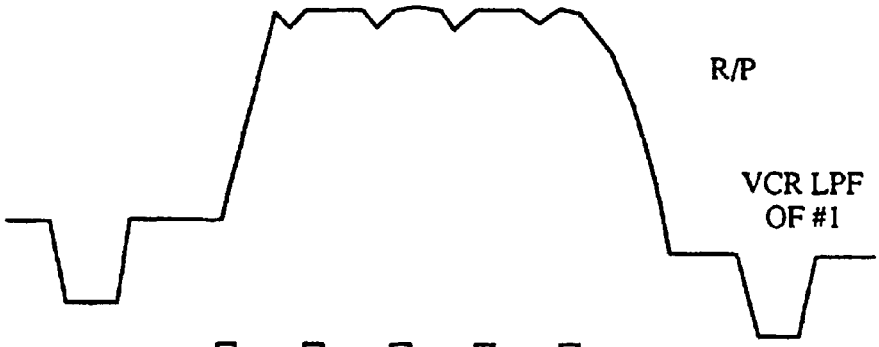
Figure 7D:
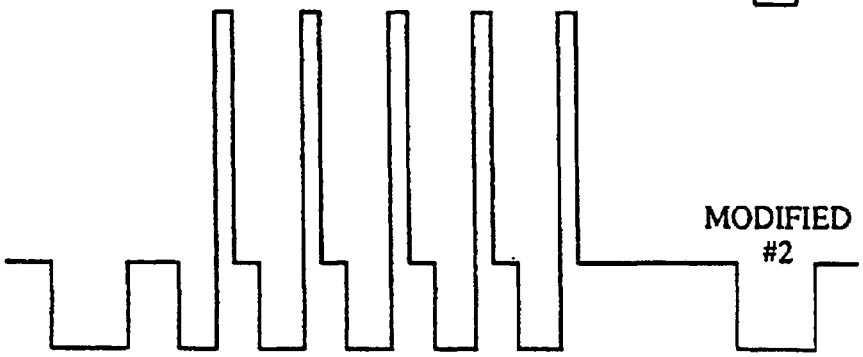
Figure 7E:
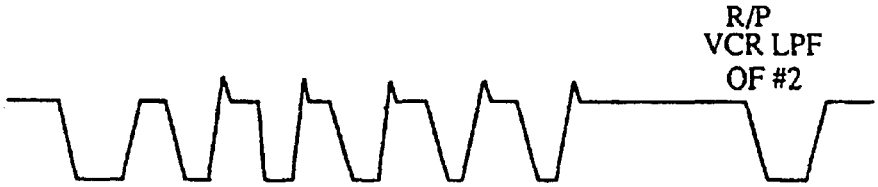
Figure 7F:
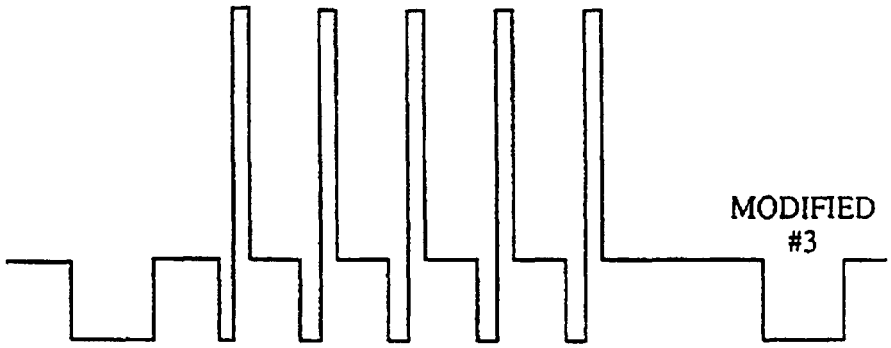
Figure 7G:
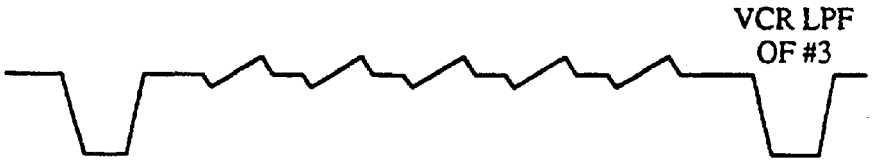

When AND gate 120 is asserted, an AGC reference pulse of a level $V_{b3}$ is inserted in the video signal at output 110, as depicted in FIG. 7(b). When AND gate 120 is deasserted, the video signal passes unchanged to the output 110. In the VCR, the video signal during a portion of the vertical interval becomes "filtered" as depicted in FIG. 7(c).

Figure 6F:
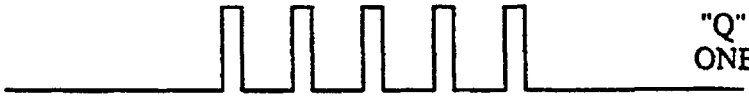

FIG. 5 illustrates a circuit for narrowing AGC pulses and/or pseudo-sync pulses. For AGC pulse narrowing, the illustrated circuit receives a control signal (FIG. 6(d)) from AND gate 120 (FIG. 4) and generates pulses having a fraction of the width of original AGC pulses. As previously explained, the control signal triggers on the leading edge of each original AGC pulse. Time-constant components, including resistor 142 and capacitor 144, establish the pulse width of one-shot 140 output pulses, as shown in FIG. 6(f). These pulses trigger additional one-shots 146 and 152. As subsequently described in further detail, one-shot 146 produces control pulses which narrows AGC pulses, while one-shot 152 produces control pulses which narrow both AGC and pseudo-sync pulses.

Figure 6G:
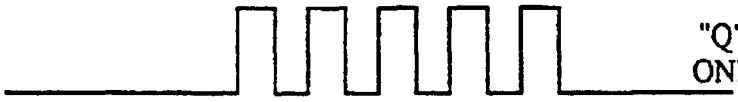
Figure 6H:
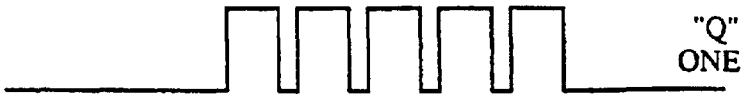
Figure 6I:
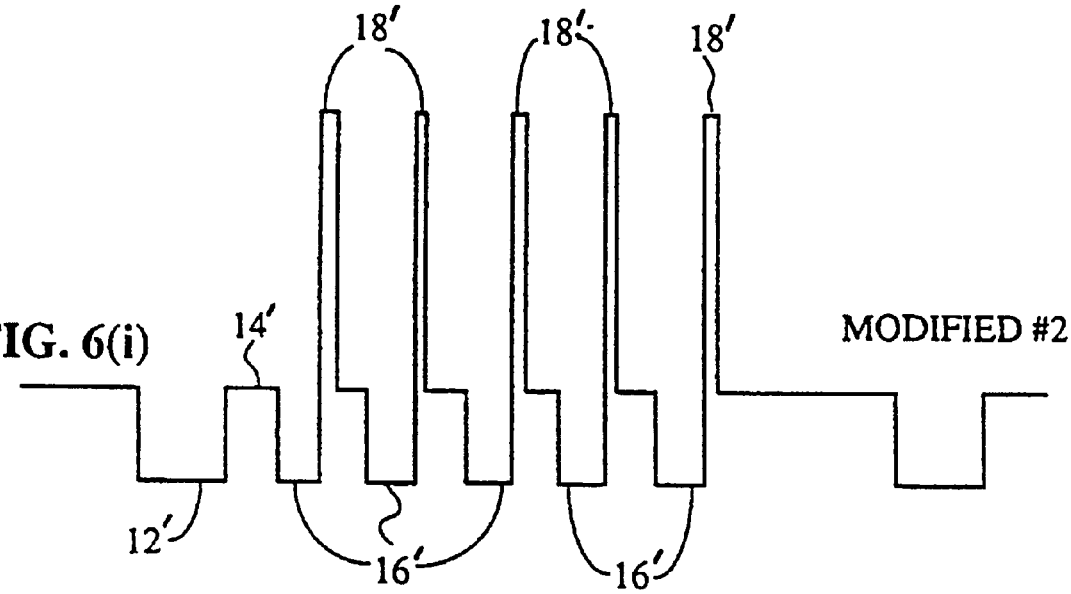
Figure 6J:
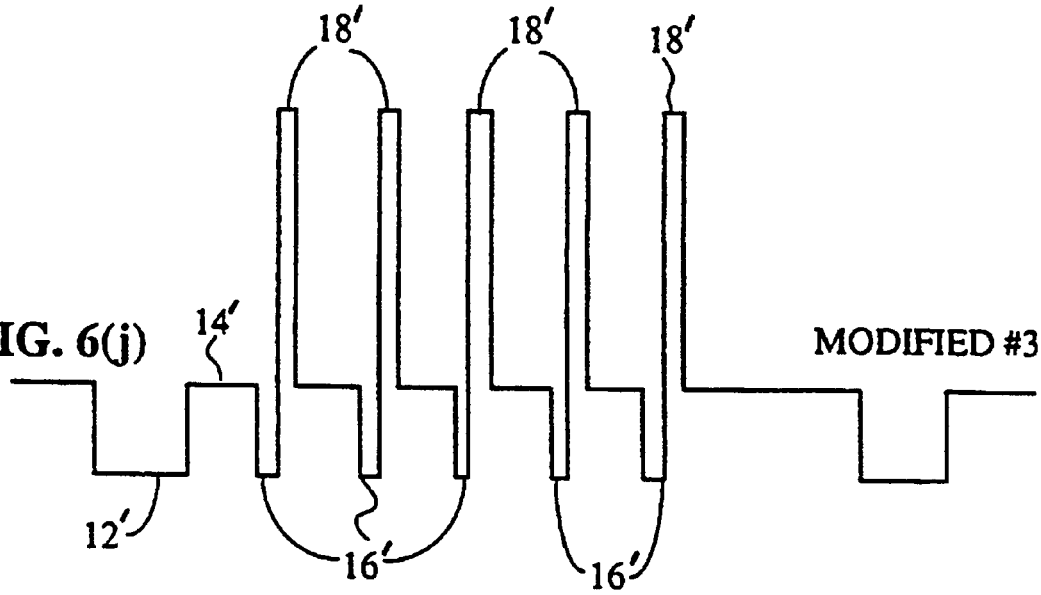

To narrow AGC pulses, the output of one-shot 146 controls switch 158 for selectively coupling either the input video signal or a blanking reference level $V_{b5}$ to buffer amplifier 160. Pulse widths (durations) emitted from one-shot 146 are established by resistor 148 and capacitor 150. Exemplary pulses are shown in FIG. 6(g). The buffer amplifier 160 supplies an output video signal from switch 158 to an output terminal 162, as shown in FIG. 6(i), which enables copying of input video having embedded copy-protect signals.

To narrow both AGC and pseudo-sync pulses, one-shot 152 produces a control signal which controls switch 164. FIG. 6(h) depicts the output of one-shot 152 in accordance with resistor-capacitor time-delay circuit 154, 156. Switch 164, under control of one-shot 152, couples either input video or a blanking reference level $V_{b6}$ to buffer amplifier 166. Buffer amplifier 166 holds the output from switch 164 for further alteration. Another control signal (FIG. 6(e)) from AND gate 106 (FIG. 4) controls a switch 168 to effect cascaded control of the video signal from switch 164. The control signal from AND gate 106 narrows the first pseudo-sync pulse of the horizontal line. As a result, the combined effect on the video signal at output 170 via buffer amplifier 172 is a video signal having both AGC pulses and pseudo-sync pulses narrowed, as shown in FIG. 6(j).

As readily understood from the foregoing, a preferred means for disabling the effect of copy-protect signal appearing in a prerecorded medium may comprise any one of or a combination of the subparts previously set forth, depending upon whether it is desired to change either or both of the AGC and pseudo-sync pulses.

FIG. 7 illustrates the relationship among original copy-protect input signals of FIG. 7(a), various selected disabling means, and typical VCR circuitry. For example, upon narrowing pseudo-sync pulses as shown by FIG. 7(b), the low-pass filtering effect of the VCR transfers a waveform illustrated in FIG. 7(c) wherein only the original sync pulse is seen, and added AGC pulses and pseudo sync pulses have disappeared. Upon narrowing AGC pulses as indicated in FIG. 7(d), the low-pass filtering effect of the VCR transfers a waveform as illustrated in FIG. 7(e) wherein the positive AGC pulses no longer affect AGC gain control. Upon narrowing both AGC and pseudo-sync pulses as indicated in FIG. 7(f), the low-pass filtering effect of the VCR transfers a waveform as illustrated in FIG. 7(g).

Figure 7H:
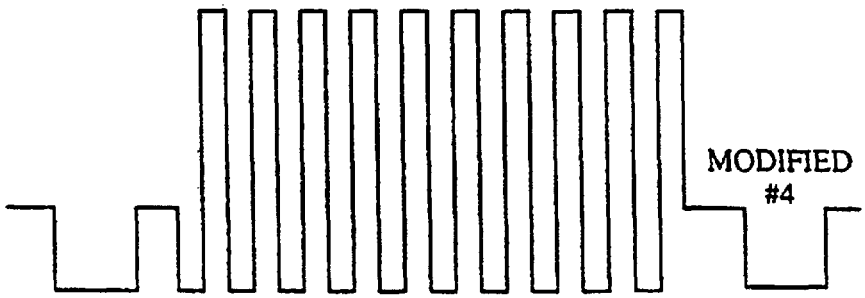
Figure 7I:
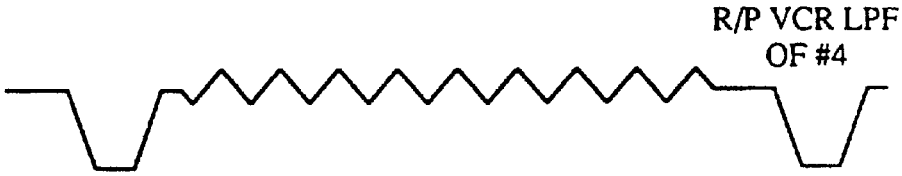

As previously indicated, any means which defeats or disables the copy-protect signals based upon the low-pass filtering effect, reduced sensitivity, or other characteristic of a typical VCR suffices to achieve the task set out by the invention. FIGS. 7(h) and 7(i) show, for example, a means of increasing the effective frequency of pulses appearing in the vertical blanking interval. In this example, AGC and pseudo-sync pulses were narrowed, multiplied, and time-compressed so as to increase their frequency as shown in FIG. 7(h). Since the VCR circuitry cannot respond quickly, the net effect due to low-pass filtering is the waveform depicted in FIG. 7(i). Further, means which attenuates the copy-protect signals during a detected portion in the vertical blanking interval by such a level to render them ineffective also achieves the task set out by the invention.

Many other variations of the method and apparatus can be appreciated based on the above teachings. In concept, those variations, modifications, and adaptations are derived from any method or apparatus which alters, substitutes or modifies the copy-protect signals in a fashion which takes into account the characteristics of VCR circuitry. Accordingly, it is intended that the subject matter of the invention be defined by the appended claims rather than the specific embodiments shown, illustrated or described.

What is claimed is as follows:

1. A method for disabling the effects of copy-protect signals added to blanking intervals of a video signal having normal sync pulses, said copy-protect signals including at least one added AGC pulse, said method comprising the steps of:

providing the video signal having said copy-protect signals added thereto;

detecting said blank interval of said video signal;

identifying the position of said at least one added AGC pulse; and developing altered video signals in response to said detecting and identifying steps in a manner so as to alter the copy-protect signals to reduce their effectiveness in copy-prevention;

wherein said developing step comprises generating a pulse of a predetermined width during said blanking interval and combining said generated pulse with copy-protect signals thereat so as to shift a DC level of at least a part of the copy-protect signals in a manner to disable copy protection.

2. A method as recited in claim 1 wherein said copy-protect signals inhibit copying by a video cassette recorder and wherein said developing step comprises altering, reproducing or regenerating said copy-protect signals in a manner where internal characteristics of said video cassette recorder inherently nullify the effects of said copy-protect signals.

3. A method as recited in claim 2 wherein said developing step comprises attenuating said copy-protect signals beyond a range of signal sensitivity of said video cassette recorder *without eliminating said copy-protect signals*.

4. A method for disabling the effects of copy-protect signals added to blanking intervals of a video signal having normal sync pulses, said copy-protect signals including at least one added AGC pulse, said method comprising the steps of:

detecting said blanking interval of said video signal;

identifying the position of said at least one added AGC pulse; and developing altered video signals in response to said detecting and identifying steps in a manner so as to alter the copy-protect signals to reduce their effectiveness in copy-prevention;

wherein said copy-protect signals inhibit copying by a video cassette recorder and wherein said developing step comprises altering, reproducing or regenerating said copy-protect signals in a manner where internal characteristics of said video cassette recorder inherently nullify the effects of said copy-protect signals; and wherein said developing step comprises increasing a frequency of said copy-protect signals beyond an effective bandwidth of a video cassette recorder.

5. A method as recited in claim 4 wherein said developing step comprises increasing an effective frequency of said copy-protect signals by narrowing widths of the pulses of said copy-protect signals.

6. A method as recited in claim 4 wherein said developing step comprises increasing an effective frequency by effectively time-compressing said copy-protect signals.

7. A method as recited in any of the [previous] *preceding* claims wherein said blanking interval is a vertical blanking interval following a normal viewing field.

8. A method as recited in [claims 1 through 6] *any of claims 1-6* wherein said video signal is a prerecorded video signal on a video cassette videotape.

9. A method for reducing the effect of copy-protect signals in a blanking interval of a video signal wherein said copy-protect signals include at least one added AGC pulse, and said blanking interval includes at least one normal sync pulse, said method comprising the steps of:

receiving an input video signal from said recording medium;

detecting the normal sync signal and identifying the location of said copy-protect signals on the basis of the detected normal sync signal;

generating copy-protect disabling signals which increase a frequency of said copy-protect signals beyond an effective bandwidth of a video cassette recorder in accordance with said detecting step; and transmitting an output video signal comprising a composite of said input video signal and said disabling signals.

10. A method for reducing the effect of copy-protect signals in a vertical blanking interval of a video signal wherein said copy-protect signals include at least one pseudo-sync pulse and an added AGC pulse, and said blanking interval includes at least one normal vertical sync pulse, said method comprising the steps of:

receiving an input video signal from said recording medium;

detecting the vertical sync signal and identifying the location of said copy-protect signals on the basis of the detected vertical sync signal;

generating copy-protect disabling signals which increase a frequency of said copy-protect signals beyond an effective bandwidth of a video cassette recorder in accordance with said detecting step; and transmitting an output video signal in accordance with a representation of said input video signal and said disabling signals.

11. An apparatus for disabling the effects of copy-protect signals in a video signal, said copy-protect signals including at least one added AGC pulse, said apparatus comprising:

receiving means for receiving an input signal representative of said video signal;

detection means connected with said receiving means for detecting said copy-protect signals;

signal disabling means responsive to said detection means for generating disabling signals; and output means for transmitting an output video signal in accordance with a representation of said input video signal and said disabling signals;

wherein said signal disabling means includes level-shifting means for effecting transmission of an output video signal at least a portion of which having its D.C. level shifted.

12. An apparatus as recited in claim 11 wherein said disabling means includes means for attenuating said copy-protect signals *without eliminating said copy-protect signals*.

13. An apparatus for disabling the effects of copy-protect signals in a video signal, said copy-protect signals including at least one added AGC pulse, said apparatus comprising:

receiving means for receiving an input signal representative of said video signal;

detection means connected with said receiving means for detecting said copy-protect signals;

signal disabling means responsive to said detection means for generating disabling signals; and output means for transmitting an output video signal in accordance with a representation of said input video signal and said disabling signals;

wherein said disabling means includes means for increasing an effective frequency of said copy-protect signals.

14. An apparatus as recited in any of the previous claims 11 to 13 wherein said video signal is a prerecorded video signal from a videotape.

15. An apparatus for disabling the effects of copy-protect signals contained in vertical blanking intervals of a video signal, said copy-protect signals including at least one added pseudo-sync signal and one added AGC pulse, said apparatus comprising:

receiving means for receiving an input signal representative of said video signal from said recording medium;

detection means connected with said receiving means for detecting said vertical blanking interval which includes said copy-protect signals;

signal disabling means responsive to said detection means for generating disabling signals during the occurrence of at least a portion of said copy-protect signals; and output means for transmitting an output video signal in accordance with a representation of said input video signal and said disabling signals;

wherein said detection means comprises a sync separator for detecting the vertical blanking interval of the video signal, said disabling means comprises means for generating a D.C. level-shifting signal during a portion of the vertical blanking interval, and said output means includes means for combining the D.C. level-shifting signal with a representation of the input video signal, thereby to transmit an output video signal having disabled copy-protect signals.

16. An apparatus as recited in claim 15 wherein said detection means comprises a sync separator for separating the vertical blanking interval from the remaining video signal, said disabling means comprises means for attenuating *without eliminating said copy-protect signals* at least a portion of said copy-protect signals thereby to produce attenuated copy-protect signals, and said output means includes means for transmitting the attenuated copy-protect signals and a representation of the input video signal thereby to transmit an output video signal having disabled copy-protect signals.

17. An apparatus for disabling the effects of copy-protect signals contained in vertical blanking intervals of a video signal, said copy-protect signals including at least one added pseudo-sync signal and one added AGC pulse, said apparatus comprising:

receiving means for receiving an input signal representative of said video signal from said recording medium;

detection means connected with said receiving means for detecting said vertical blanking interval which includes said copy-protect signals;

signal disabling means responsive to said detection means for generating disabling signals during the occurrence of at least a portion of said copy-protect signals; and output means for transmitting an output video signal in accordance with a representation of said input video signal and said disabling signals;

wherein said detection means comprises a sync separator for separating the vertical blanking interval from the remaining video signal, said disabling means comprises means for increasing an effective frequency of said copy-protect signals thereby to produce altered signals, and said output means includes means for transmitting the altered signals and a representation of the input video signal.

*18. A method for reducing effects of copy-protect signals in vertical blanking intervals of a video signal, said copy-protect signals including pulses added to said vertical blanking intervals, said method comprising the steps of:*

*receiving a video signal having said pulses added thereto;*

*detecting a vertical blanking interval of said video signal;*

*shifting a voltage level of at least a part of said video signal in said vertical blanking interval, wherein the only negative-going pulses present in said vertical blanking interval extending below a voltage reference level are horizontal sync pulses, thereby enabling copying of said video signal.*

*19. The method of claim 18 wherein said voltage reference level is that of processing circuitry of a video cassette recorder.*

*20. The method of claim 19 wherein said voltage reference level is an AGC level.*

*21. The method of claim 18 wherein said video signal is a prerecorded video signal on a video cassette tape.*

*22. A method for reducing effects of copy-protect signals in blanking intervals of a video signal, said copy-protect signals including at least one added pulse and each blanking interval including at least one sync pulse preceding said added pulse, said method comprising the steps of:*

*receiving an input video signal;*

*detecting said at least one sync pulse;*

*generating copy-protect disabling signals which increase a frequency of said copy-protect signals beyond an effective bandwidth of a video cassette recorder, in accordance with said detecting step; and*

*providing an output video signal including a composite of said input video signal and said disabling signals.*

*23. A method as recited in claim 22 wherein said generating step comprises increasing an effective frequency of said copy-protect signals by narrowing widths of the pulses of said copy-protect signals.*

*24. A method as recited in claim 22 wherein said generating step comprises increasing an effective frequency by effectively time-compressing said copy-protect signals.*

*25. A method as recited in claim 22 wherein said blanking interval is a vertical blanking interval following a normal viewing field.*

*26. A method as recited in claim 22 wherein said video signal is a prerecorded video signal on a video cassette tape.*

*27. An apparatus for reducing effects of copy-protect signals in a video signal, said copy-protect signals including at least one added pulse, said apparatus comprising:*

*a video input terminal receiving an input signal representative of said video signal;*

*a sync separator having an input terminal connected to said video input terminal and having an output terminal, thereby providing at said output terminal a signal indicating a blanking interval of said video signal;*

*disabling circuitry having an input terminal connected to said output terminal of said sync separator, and having an output terminal, providing at said output terminal of said disabling circuitry altered copy-protect signals having an increased effective frequency; and*

*a video output terminal connected to said output terminal of said disabling circuitry and to said video input terminal, thereby providing a composite of said input video signal and said altered copy-protect signals.*

*28. An apparatus as recited in claim 27 wherein said disabling circuitry increases an effective frequency of said copy-protect signals by narrowing widths of the pulses of said copy-protect signals.*

*29. An apparatus as recited in claim 27 wherein said disabling circuitry increases an effective frequency by effectively time-compressing said copy-protect signals.*

*30. An apparatus as recited in claim 27 wherein said blanking interval is a vertical blanking interval following a normal viewing field.*

*31. An apparatus as recited in claim 27 wherein said video signal is a prerecorded video signal on a video cassette tape.*

*32. A method for reducing effects of copy-protect signals in vertical blanking intervals of a video signal, said copy-protect signals including pulses added to said vertical blanking intervals, said method comprising the steps of:*

*receiving a video signal having said pulses added thereto;*

*detecting a vertical blanking interval of said video signal;*

*shifting a voltage level of at least a part of said video signal in said vertical blanking interval, wherein the only negative-going pulses present in said vertical blanking interval extending below a voltage reference level are horizontal sync pulses or vertical sync pulses, thereby enabling copying of said video signal.*

*33. A method as recited in claim 32, wherein said copy-protect signals include pseudo-sync pulses that are shifted to a voltage level above the level of the horizontal sync tip voltage or the pseudo-sync pulses are shifted to a level above the slice threshold for sync separation.*

*34. A method as recited in claim 32, wherein all or part of said copy-protect signals are shifted in voltage to render the resulting copy-protect signals ineffective to prevent copying by a video cassette recorder.*

*35. A method for reducing the effects of copy-protect signals in vertical blanking intervals of a video signal, said copy-protect signals including pulses added to said vertical blanking intervals, said method comprising:*

*receiving a video signal having said pulses added thereto;*

*detecting a vertical blanking interval of said video signal; and*

*regenerating at least a part of said video signal in said vertical blanking interval, wherein the only negative-going pulses present in said vertical blanking interval extending below a voltage reference level and detectable by a video cassette recorder sync separator are horizontal or vertical sync pulses, thereby enabling copying of said video signal.*

*36. A method as recited in claim 35, wherein said regenerating comprises regenerating at least a part of said video signal in said vertical blanking interval without AGC pulses.*

*37. A method as recited in claim 35, wherein said voltage reference level is that of processing circuitry of a video cassette recorder.*

*38. A method as recited in claim 35, wherein said voltage reference level is an AGC level.*

*39. A method for reducing the effects of copy-protect signals in vertical blanking intervals of a video signal, said copy-protect signals including pulses added to said vertical blanking intervals, said method comprising:*

*receiving a video signal having said pulses added thereto;*

*detecting a vertical blanking interval of said video signal; and*

*regenerating at least a part of said video signal in said vertical blanking interval, wherein the only negative-going pulses present in said vertical blanking interval extending below a voltage reference level and detectable by a video cassette recorder sync separator are normal sync pulses, thereby enabling copying of said video signal.*

*40. A method as recited in claim 39, wherein said regenerating comprises regenerating at least a part of said video signal in said vertical blanking interval without added AGC pulses.*

*41. A method as recited in claim 39, wherein said voltage reference level is that of processing circuitry of a video cassette recorder.*

* * * * *